May 13, 1930.  R. W. WAGNER  1,758,268
MEASURING AND SORTING DEVICE
Filed Oct. 22, 1925  3 Sheets-Sheet 1
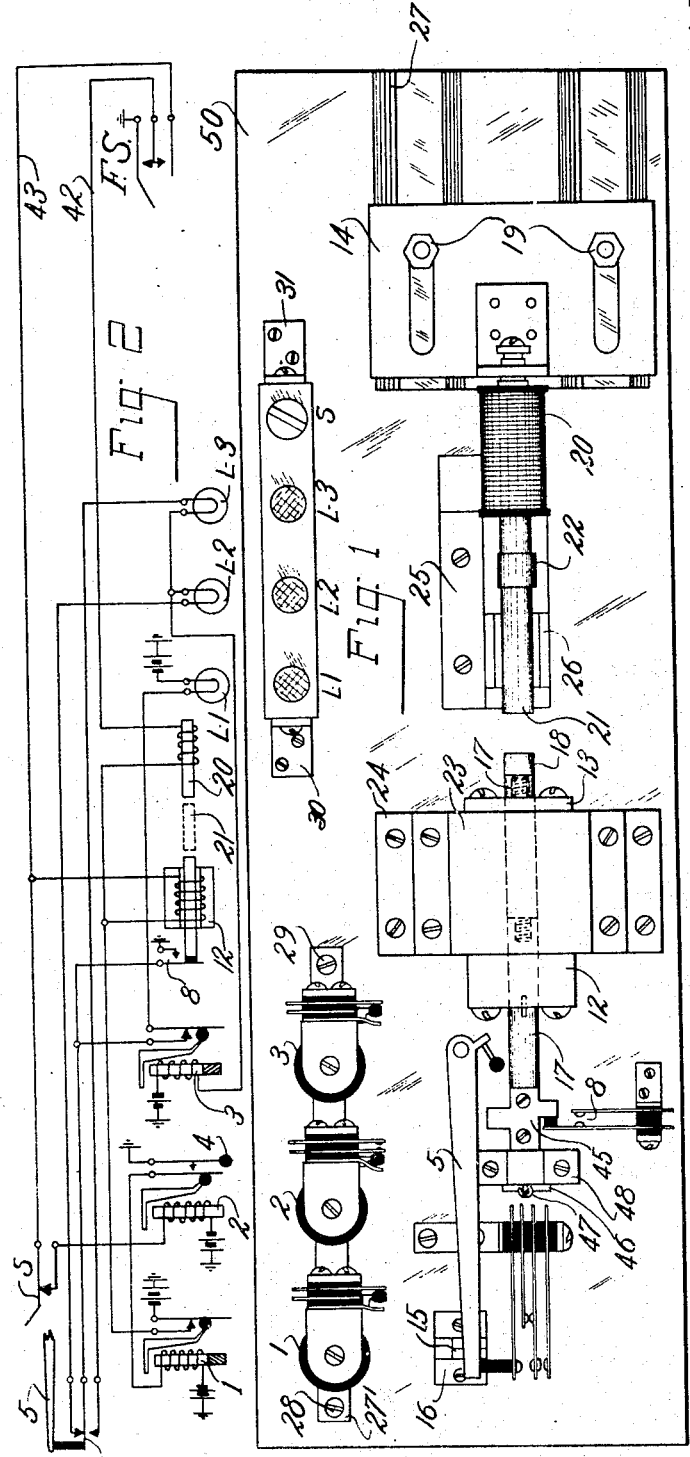
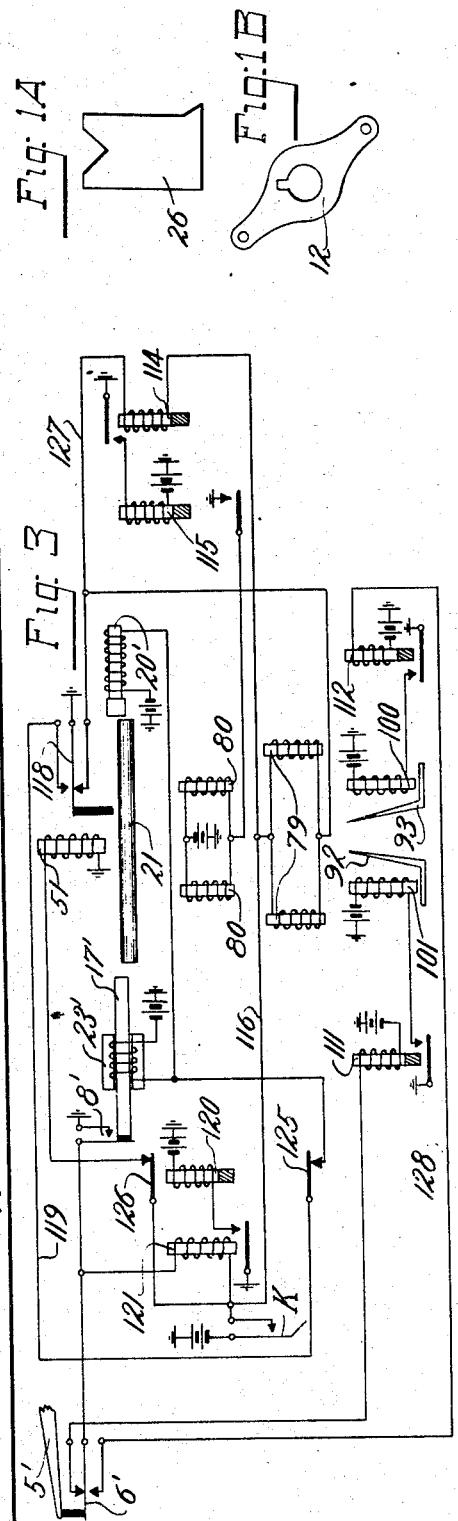
Inventor
Ralph W. Wagner
Wm. Walter Owen Atty.

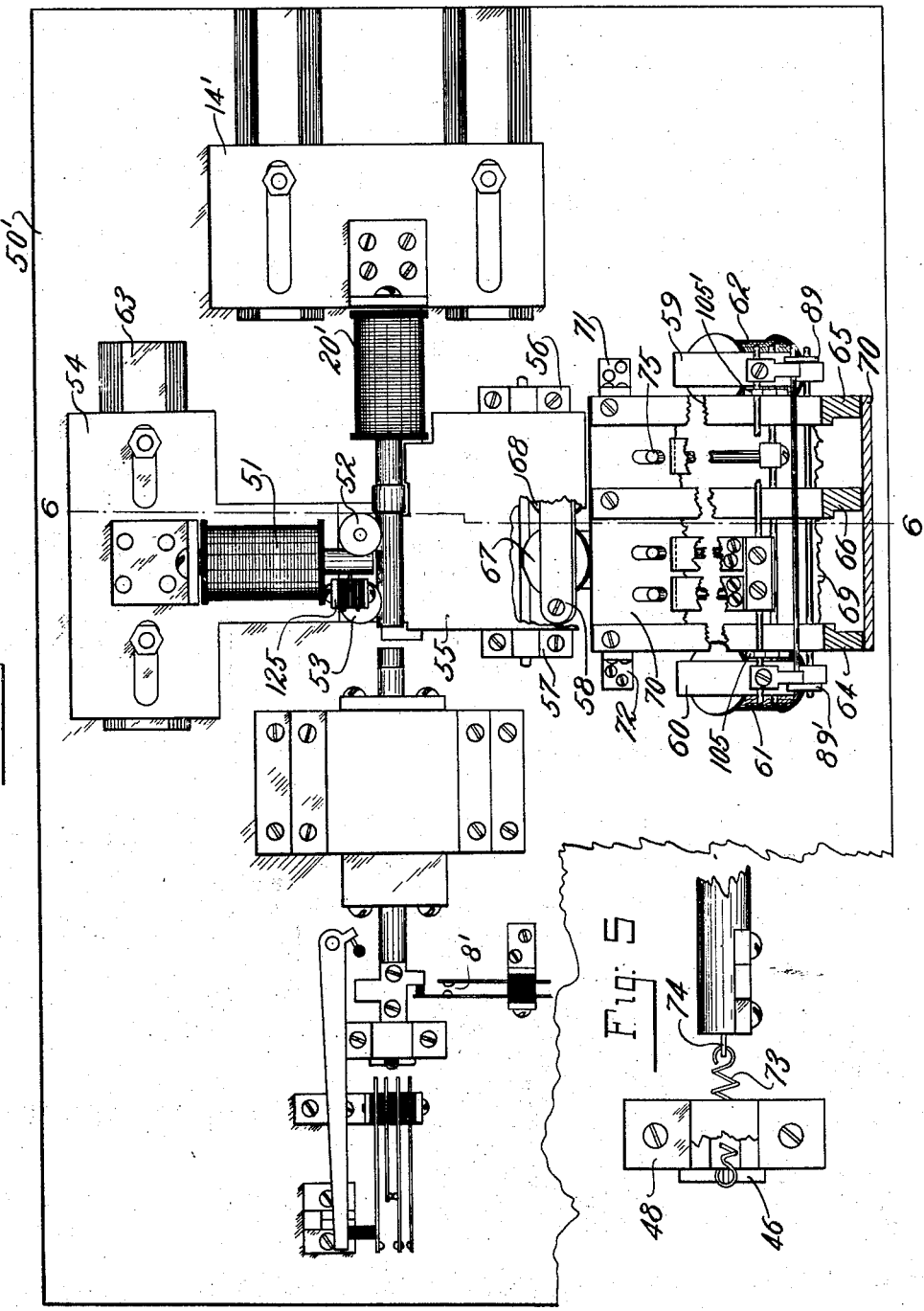

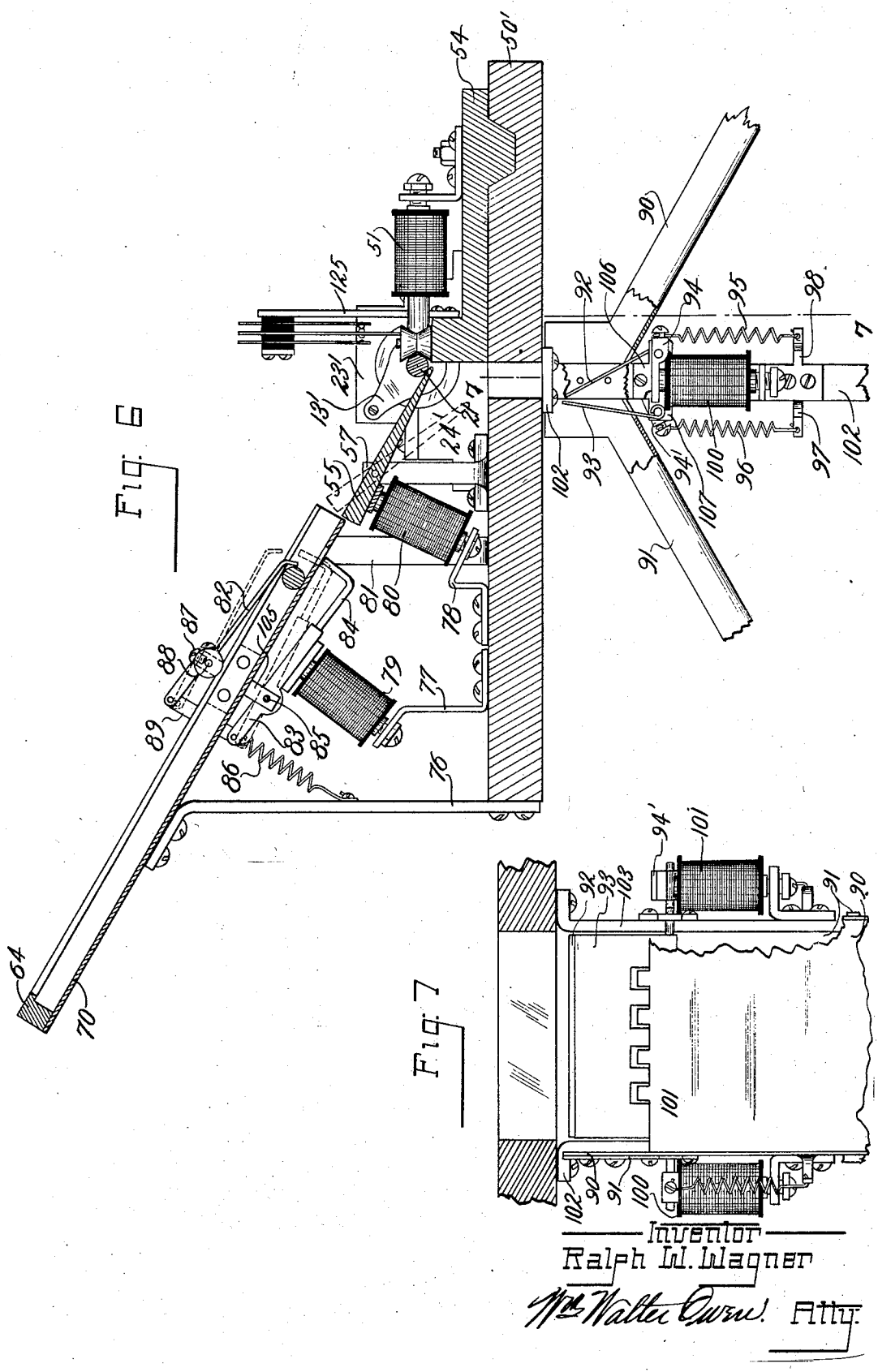

Patented May 13, 1930

1,758,268

UNITED STATES PATENT OFFICE

RALPH W. WAGNER, OF CHICAGO, ILLINOIS, ASSIGNOR, BY MESNE ASSIGNMENTS, TO AUTOMATIC ELECTRIC INC., OF CHICAGO, ILLINOIS, A CORPORATION OF DELAWARE

MEASURING AND SORTING DEVICE

Application filed October 22, 1925. Serial No. 64,278.

The present invention relates in general to measuring and sorting devices, but is particularly concerned with devices of a character suitable for use in measuring and sorting cores used in the construction of relays and magnets, although not necessarily limited to such use.

The object of the invention is to provide devices of the above character which will be economical to manufacture and be very speedy and accurate in measuring and sorting cores or any other material for which the mechanism is designed.

The invention is disclosed and illustrated in three sheets of drawings comprising Figs. 1 to 7, inclusive.

Figure 1 is a top view of the measuring device in its simplest form, designed to be manually fed and controlled. Figures 1$^A$ and 1$^B$ are details. Figure 2 diagrammatically illustrates the circuit used in operating the device shown in Fig. 1. Figure 3 discloses diagrammatically the circuits used in operating a device similar to that shown in Fig. 1 except that mechanisms are added for automatically feeding the cores or material to be measured to the device measuring them, and sorting the cores or material accordingly depending on whether it is oversize, up to the desired size or is undersize. Figure 4 is a top view of part of the mechanism controlled and operated by the circuit arrangement shown in Fig. 3. Figure 5 is a detail. Figure 6 is a cross section in elevation of Fig. 4 taken on the line 6—6. Figure 7 is a view in elevation and in part cross section of Fig. 6 taken on line 7—7.

In the construction shown in Fig. 1 a main base or mounting plate 50 is provided. Mounted on this base is a group of relays 1, 2, and 3 which are first mounted on a bar 27' and then secured to the base by screws 28 and 29. On the upper righthand portion of the base a small panel is mounted upon the base by use of brackets 30 and 31. This panel carries three lights L$^1$, L$^2$, and L$^3$ and a turn switch S. At the extreme lower righthand corner of the base a bed plate is provided which is secured to the base by machine screws extending through perforations in the base 50 and entering tapped perforations in the bottom of bed plate 27. A carriage, 14, which is in keyed relation to the bed plate and which carries the magnet 20, is arranged to be adjustable to enable the device to be used to measure various length cores by merely shifting the plate 14 to a desired position and tightening nuts 19. The magnet 20 is also adjustably connected to the bracket carried by plate 14. This latter adjustment is particularly desirable when fine adjustments are necessary.

Below the magnet 20 and to the left of this magnet a portion of the base is cut away a substantial part of its depth and a guide block 26 is locked in this depression by plate 25 and the associated screws. This guide block is provided to insure the cores such as 21 being positioned exactly in alignment with the extension 18 on plunger 17 and the extension 22 on the core of magnet 20. Figure 1$^A$ shows a detailed view of the guide block.

The extension 22 consists of a steel cap driven on the end of the core of magnet 20, while in case of the extension 18, the extension consists of a steel block having a threaded extension extending into a tapped perforation in the bronze plunger 17, which is in turn secured in a similar manner to the core 17' of solenoid 23'. This core, and the core of magnet 20, are made of Norway iron. It will be understood that these steel extensions are added merely to prolong the life of the measuring apparatus. The solenoid 23' is secured to the base 50 by holding blocks 23 and 24. A bracket 48 limits the movement of the core 17' to the left, while a spring 47 (see Fig. 5) having one end fixed to the core and the other end fixed to a plate 46 normally holds the plunger in the position shown.

A member 45 is secured to the core 17' and cooperate with contact springs 8 and a bushing on member 5 to operate springs 8 and the spring combination associated with arm 5 in a manner and for a purpose which will be made clear when the operation of the mechanism is described.

The manner of operation of the device as described in Figs. 1 and 2 will now be explained. The operator places a core 21 in the guide 26 and operates foot switch FS. The operation of this switch grounds conductors 42 and 43, thereby completing a circuit for the core holding magnet 20 to battery through the resting contact and armature of relay 1. At the same time a circuit is completed for the solenoid 23' via springs of the foot switch, conductor 43, winding of the solenoid 23' to battery supplied via the springs of relay 1. The solenoid, upon operating, causes the extension 18 to engage the core 21 and also permits the closure of contact springs 8 and the operation of spring 6, a distance dependent on the length of the cores being measured.

If the core is of the correct length, spring 6 will break contact, but will not engage its working contact and a circuit will be completed from battery through lamp $L^1$, contacts of relay 3 to ground by way of springs 8. Lamp $L^1$ will accordingly be lighted to notify the operator that the core is of the proper length.

If the core is too long spring 6 will not disengage from resting contact and a circuit will therefore be completed for lamp $L^2$, from ground supplied by springs 8, spring 6 and its resting contact to lamp $L^2$ and through the winding of relay 3 to battery. Relay 3 operates to prevent the lamp $L^1$ from lighting at this time. The lamp $L^2$ in lighting informs the operator the core is too long.

If the core is too short the spring 6 will break away from its resting contact and engage its working contact causing a circuit to be completed from the grounded spring 8 and its working contact, spring 6 and its working contacts to lamp $L^3$ and to battery via the winding of relay 3, causing this relay to operate to prevent the lighting of lamp $L^1$. The lamp $L^3$ lights, however, to notify the operator that the core is too short.

The operation of the foot switch also closes a circuit for relay 2 via turn switch S and conductor 43. This relay is of the type which has one of its springs provided with a weighted pendulum which delays the permanent closure of its contacts for a prolonged interval after which the circuit for slow to pull relay 1 is completed to cut off battery from the winding of the solenoid 23' and the holding magnet 20, should the operator fail to remove her foot from the foot switch within a definite period. Ordinarily, however, an efficient operator will test and measure cores at a speed which does away with the actual necessity of providing relays 1 and 2. Since the foot switch opens and closes the circut for solenoid 23' and holding magnet 20, and since the relays 1 and 2 have no bearing on the actual indication, it will be seen that they can be omitted and the operation will be just the same as far as actual results are concerned. In the ordinary operation, however, relay 2 will be intermittently energized and will maintain its contacts constantly vibrating and the relay 1 will, of course, not be operated. The relays 1 and 2 are desirable, however, in that an operator may stop measuring cores for quite a period and unconsciously fail to remove her foot from the foot switch causing the current to be unnecessarily consumed by the continued energized condition of solenoid 23' and holding magnet 20.

The construction and operation of the modification covered by Figs. 3 to 77, inclusive, will now be explained. It will be noted that the top view of Fig. 4 is in many respects the same as that of Fig. 1. In Fig. 4, however, the base is somewhat wider. In this modification no supervisory equipment is necessary and, therefore, no relays are mounted on the base, but instead, any relays used are mounted in a cabinet convenient to or immediately beneath the base in any suitable manner.

The measuring mechanism differs from that shown in Fig. 1 in that the alignment block such as 26 of Figs. 1 and 1$^A$ is omitted and a carriage, 54, is mounted in much the same manner as carriages 14' and 14, the mounting of the latter of which has previously been described. The carriage 54 has a holding magnet 51 secured to it and in addition two spools, 52 and 53, which are rotatably mounted on pins inserted in the carriage as shown in Figs. 4 and 6. A bracket, 125, is also mounted on the carriage 54 and carries springs which are adapted to be operated by the cores when they engage spools 52 and 53, as will be described subsequently.

Also mounted on the base 50' is a bracket 77 which carries magnet 79. A chute, comprising in the main a base 70, and side rails 64 and 65, is secured to base 50' by supporting members 76 and 81. Attached to the rails 64 and 65 of this chute is an escapement device comprising an arm 82 secured to shaft 88 by screw 87, and an arm 84 pivoted to shaft 85. These arms are linked together at their extreme left end by links 89 and 89'. The shafts 85 and 88 rotate in bearings comprising perforations in mounting plates 105 and 105' which are attached to rails 64 and 65 as shown in Figs. 4 and 6 The dotted lines show the escapement device in normal position.

To the immediate right of bracket 77, is a bracket 78 supporting a magnet 80. Immediately to the right of the magnet, brackets 56 and 57 are mounted on base 50', and on these brackets is pivoted a swinging platform 55 adapted to be controlled by the magnet 80. The platform is shown in operated position, the dotted line indicating its normal position.

A study of the disclosure of Fig. 6 will clearly bring out that each time magnet 79 energizes and deenergizes, it allows a core to pass beyond its control. Furthermore, it will be seen that when a core passes beyond the control of magnet 79, it is placed under control of magnet 80 and the platform 55.

An opening in the base 50' is provided for receiving the cores 21 after they have been measured and magnets 100 and 101 control a pair of trap doors 92, and 93 to determine whether the core passes out chutes 91—90 or drops directly down through the opening between magnets 100 and 101.

These magnets, as clearly shown in Fig. 7, are secured to brackets 102 and 103 which are in turn secured to the bottom of base 105 just beyond the end of the opening for receiving the cores. Members 106 and 107 are secured to the respective brackets 103 and 102 to serve as bearing plates for pivoting armatures 94 and 94' of magnets 100 and 101 and for the doors 92 and 93 operated by these magnets. Brackets 97 and 98 are also attached to the brackets 102 and 103 to provide mountings for the restoring springs 95 and 96, the other end of these springs being hooked over screws utilized in locking the doors 92 and 93 in fixed relation to their associated shafts and armatures.

Also secured to the brackets 102 and 103 are chutes 90 and 91, the chute 91 being just sufficiently wider than 90 to allow it to slide over 90 at its fastening point so that both chutes are held on to brackets 102 and 103 by the same screws. As will be noted from Fig. 7 and Fig. 6, the upper end of the base of these chutes are dovetailed as are the bottom edges of armatures 92 and 93 so that either of the doors 92 or 93 may be in normal position without leaving an opening in which the cores might lodge when passing through either of the chutes. The magnet 100 and the door 92, operated by it, are shown in operated position.

The operation of the automatic measuring and sorting device will now be described. Battery is turned on by operating key K which completes a circuit for initiating the operation by applying battery to holding magnet 51 by way of armature 125 and its resting contact, and by also applying battery by way of conductor 116 to slow release relay 114 and to ground by way of conductor 127 and resting contact and spring 118. A branch of the circuit over conductor 116 also extends to the escapement magnets 79 which, upon operating, releases a core 21. The released core is stopped by platform 55, which is still in its normal position. Relay 114 in operating completes a circuit for a second slow release relay 115 which in turn completes an operating circuit for magnets 80. These magnets in operating shift platform 55 out of the path of a core 21 into the position it is shown in Fig. 6, allowing the core 21 to roll down over the platform and to engage the spool or guides 52 and 53. The core is firmly held against these guides by magnetism of magnet 51 and also engages the bushing on spring 118. The operation of spring 118 completes the circuit for the solenoid 23' and holding magnet 20' by way of conductor 119, armature 125 and its resting contact to the solenoid 23' and holding magnet 20' in multiple to battery. As a result the plunger 17' shifts to the right operating springs 8' and continuing until it engages the core. It may or may not cause movement of lever 5' as described in connection with the manually operated measuring device.

The closure of springs 8' completes a circuit for relay 121, which in turn completes a circuit for slow release relay 120. This latter relay, upon operating, at its armatures 126 and 125 opens the circuits of holding magnets 20', 51, and solenoid 23'. At substantially the same time, due to the operated condition of spring 118, the relay 114 has become deenergized and has opened the circuit of relay 115 and 115 has deenergized to open the circuit of platform operating magnet 80, allowing platform 55 to return to normal by gravity to allow core 21 to drop down to the opening in the base 50'.

As soon as the core leaves the position shown in Fig. 6, the spring 118 restores to normal, again completing a circuit for escapment magnets 79, which now become energized to release another core between member 84 and the left hand edge of platform 55, which now prevents the core from passing on down upon the platform.

If the member 5' is operated, the spring 6' is shifted a distance dependent on the length of the core. If the core is too long spring 6' does not break away from its resting contact and, therefore, a circuit is completed from spring 8' and its grounded working contact through resting contact and spring 6' to slow release relay 111, which in turn causes the operation of magnet 101 to shift the door 92 to the left as illustrated in Fig. 6, causing the core 21 to pass out chute 90.

If the core is too short lever 5' is operated sufficiently to cause spring 6' to engage its working contact and a circuit is therefore completed from spring 8' and its grounded working contact through spring 6' and its working contact, conductor 128, through slow release relay 112 to battery. This relay operates and completes the circuit for magnet 100 to shift door 93 to the right, thereby causing the core to pass out chute 91.

In case the core is of the correct length, spring 6' will break away from its resting contact, but will not engage its working contact and, therefore, neither of the relays or magnets 101 or 100 will be operated and the core will drop directly through into the OK chute. This sequence of operation takes place indefinitely as long as cores are supplied to the chute.

From observation of Fig. 4, it will be noted that the escapement is provided with three sets of arms and that the chute is divided into two parts by the rail or guide 66. Ordinarily the arm 75 and its cooperating arm and the space between rails 65 and 66 is not utilized. If, however, extra long cores are to be measured the guide 66 is removed and carriages 14' and 54 are moved to the right. Cores of extra length may then be measured in the same manner as described in the foregoing.

From the foregoing it will be appreciated that applicant has designed measuring devices which are adapted for use either where a moderate number of cores are to be measured or where the quantity to be measured is very great and where the cost of installation is very moderate compared to the labor saved.

What is claimed is:

In a device for measuring lengths of magnetic material, a grooved rest for said material, an electro-magnet chuck, an energizing circuit for the electro-magnet thereof, an electro-magnetic measuring device, an energizing circuit for the electro-magnet of said device, a plurality of signal lamps, operating circuits for said lamps and controlled by said measuring device, means for first completing the energizing circuit of the electro-magnet of said chuck and then completing the energizing circuit of the electro-magnet of said device, said electro-magnetic chuck moving the magnetic material being measured into measuring position and cooperating with said rest to hold said material in that position, said measuring device controlling the operating circuits of said lamps to light the lamp individually indicative of the measurement of the length of magnetic material.

In witness whereof, I hereunto subscribe my name this 17th day of October, A. D. 1925.

RALPH. W. WAGNER.